E. T. FOOTE.
BATTERY CHARGING EQUIPMENT.
APPLICATION FILED APR. 21, 1917.
1,319,215.
Patented Oct. 21, 1919.
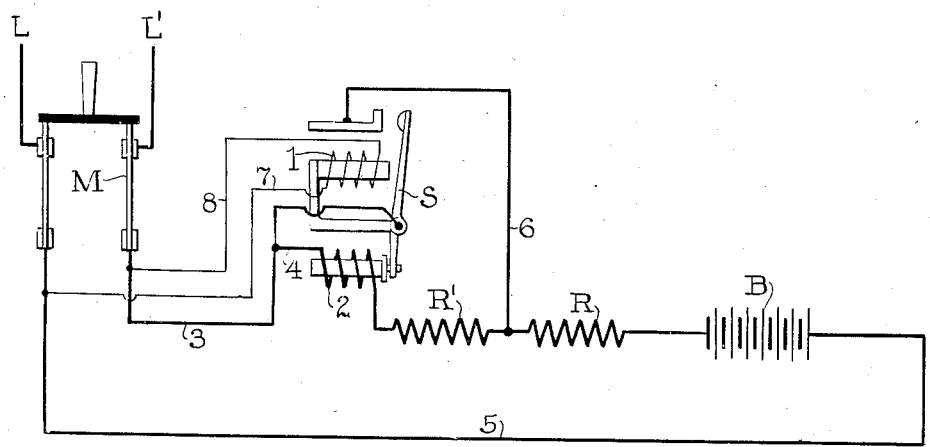

UNITED STATES PATENT OFFICE.

EDWARD T. FOOTE, OF BOSTON, MASSACHUSETTS, ASSIGNOR TO THE CUTLER-HAMMER MFG. CO., OF MILWAUKEE, WISCONSIN, A CORPORATION OF WISCONSIN.

BATTERY-CHARGING EQUIPMENT.

1,319,215.     Specification of Letters Patent.     Patented Oct. 21, 1919.

Application filed April 21, 1917. Serial No. 163,568.

*To all whom it may concern:*

Be it known that I, EDWARD T. FOOTE, a citizen of the United States, residing at Boston, in the county of Suffolk and State of Massachusetts, have invented new and useful Improvements in Battery-Charging Equipments, of which the following is a full, clear, concise and exact description, reference being had to the accompanying drawing, forming a part of this specification.

This invention relates to battery charging equipment and more particularly to the so-called " across the line " type of equipment disclosed in my prior Patent No. 1,227,771, granted May 29, 1917.

Said prior application discloses equipment including a resistance for inclusion in series with the battery when initially connected to the charging line, and an electromagnetic switch for automatically excluding said resistance under predetermined electrical conditions, and while such equipment is very satisfactory, the present invention aims to improve the same in certain details. For example, the present invention has among its objects to minimize the tendency of an only slightly discharged battery to prevent proper operation of the resistance controlling switch, it being understood that the batteries to be charged may vary widely in degree of discharge when initially connected in circuit.

Other objects and advantages will hereinafter appear.

The accompanying drawing illustrates diagrammatically one of the forms which the invention may assume in practice.

Referring to the drawing, the same discloses a battery B to be connected across supply lines L, L' through a switch M, a fixed resistance R and a removable resistance R' to be included in series with said battery for reducing the initial surge of current therethrough, and a switch S, having a closing winding 1 and a lockout winding 2, to automatically exclude the resistance R' under certain electrical conditions.

The closing winding 1 is connected directly across the charging circuit whereby a definite current is insured therein irrespective of the conditions obtaining in said circuit. The lockout winding 2 is arranged in series with the battery, but subject to exclusion from circuit together with resistance R' upon closure of switch S, the latter being biased to open position by gravity or otherwise.

Upon completion of circuit through the battery, the same is fully protected by the series resistance, against the initial inrush of current and such inrush of current causes the lockout winding 2 to prevent closure of switch S. However, the battery resistance increases with charging, the current through said winding subsides, thereby permitting the winding 1 to close the switch S with the results aforestated when the charging current is reduced to a predetermined value. The connection of the closing winding directly across the charging circuit insures ample current for closing the switch even when, as in charging a battery which is but slightly discharged, the current through said circuit might be insufficient to effect the necessary preponderance of said closing winding.

The foregoing circuits may be traced as follows: The charging circuit with the switch S open, extends from line L' through the main switch, thence by conductors 3 and 4 through the lockout winding 2 and through resistances R' and R and battery B in series, thence by conductor 5 through the main switch to line L. After closure of the switch S, said circuit extends from the main switch by conductor 3 through switch S, thence by conductor 6 through resistance R and battery B in series, returning to line L as previously traced. The closing winding 1 of switch S is connected directly across the charging circuit above described by conductors 7 and 8.

What I claim as new and desire to secure by Letters Patent is:

1. In combination, a battery, a source of current for charging the same, a resistance normally included in circuit with the battery, an electro-responsive switch to automatically exclude said resistance from circuit, said switch being self locking against response under predetermined current conditions in the battery circuit and having its operating winding independent of current variation in said battery circuit.

2. In combination, a battery, a source of current for charging the same, a resistance normally included in circuit with said battery, an electro-responsive switch to automatically exclude said resistance from circuit, said switch having a lockout winding in series with said battery and a shunt operating winding.

3. In combination, a battery, a source of current for charging the same, a fixed resistance included in circuit with said battery, a removable resistance normally included in said circuit and an electro-responsive switch having a lockout winding normally included in series with said battery and a shunt operating winding, said switch upon responding acting to exclude said removable resistance and said lockout winding from the battery circuit.

In witness whereof, I have hereunto subscribed my name.

EDWARD T. FOOTE.